L. E. NORQUIST.
CATAMENIAL APPLIANCE.
APPLICATION FILED JULY 20, 1917.
1,241,652.
Patented Oct. 2, 1917.
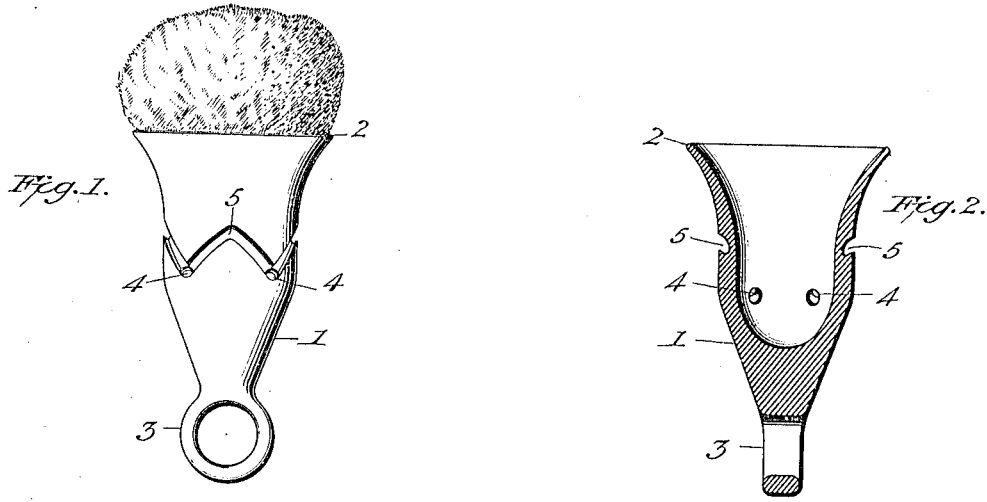
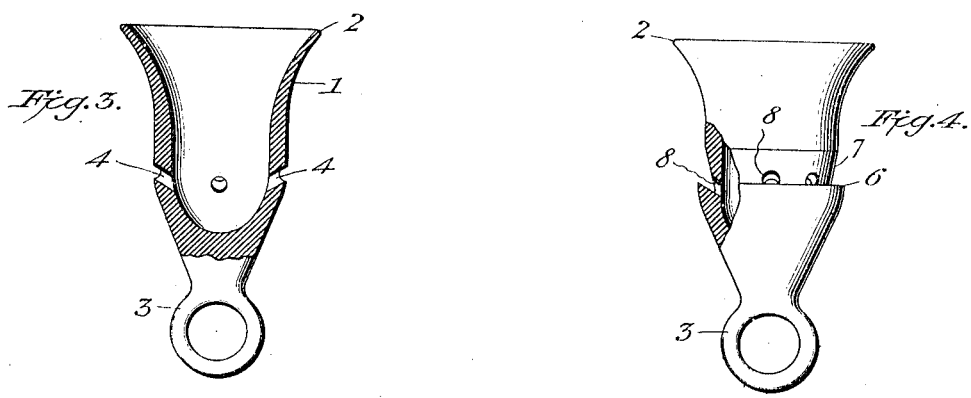

UNITED STATES PATENT OFFICE.

LESTER E. NORQUIST, OF DENVER, COLORADO.

CATAMENIAL APPLIANCE.

1,241,652.

Specification of Letters Patent.

Patented Oct. 2, 1917.

Application filed July 20, 1917. Serial No. 181,845.

*To all whom it may concern:*

Be it known that I, LESTER E. NORQUIST, a citizen of the United States of America, residing at the city and county of Denver and State of Colorado, have invented a new and useful Catamenial Appliance, of which the following is a specification.

This invention relates to improvements in catamenial appliances. The object of the invention is to provide a sanitary appliance of this character, which eliminates the use of all forms of bandages and supports and which effectually prevents soiling of the clothing of the wearer.

Further, to provide a catamenial appliance in the form of a suitable elongated cup or vessel which is adapted to be inserted in the vagina, the said vessel being adapted to hold a suitable absorbent element such as a sponge, which, with the vessel, may be removed and sterilized when necessary for sanitary reasons, the wall of the vessel being formed with apertures through which any secretions passing by the rim of the vessel will be conducted into the interior of the vessel and absorbed by the sponge, the said vessel occasioning no inconvenience to the wearer and requiring no external supporting means.

These objects are accomplished by the device illustrated in the accompanying drawings, in which:

Figure 1 is a side elevation of the improved device showing a sponge inserted in the same.

Fig. 2 is a vertical sectional view of the same.

Fig. 3 is a similar sectional view to Fig. 2, but taken through one of the inlet apertures.

Fig. 4 is a side view partly broken away, of a modified form of the vessel.

Referring to the accompanying drawings: The numeral 1 indicates the cup or vessel which is made of any material suitable for the purpose, such as hard or relatively soft rubber. The vessel is circular in cross section and has a flared rim portion 2, of suitable diameter, and from a point about midway of its length it tapers toward its lower end, which terminates in a ring 3, which is grasped by the thumb and finger when inserting or removing the vessel. About midway of its length the wall of the vessel is formed with a plurality of inlet apertures 4, four being shown, which extend through the wall at a downward inclination. These apertures are connected by an endless zig-zag channel 5, which is formed in the periphery of the wall so as to form an inverted V-shaped section between each two holes, as clearly shown in Fig. 1, and this channel is cut as shown in Fig. 2, so that its lower edge forms a retaining lip.

The upper portion of the vessel is sufficiently flared to engage the wall of the vagina and be held by the natural contraction thereof, and the rim terminates in a thin rounded edge.

An absorbent element, preferably a sponge, is inserted in the vessel, a considerable portion extending above the rim thereof. The sponge absorbs the secretion, and when necessary may be removed and cleansed. The thin but rounded rim 2 is adapted to prevent the escape of the secretion, but should any pass below the rim, it will enter the channels 5 and pass into the vessel through the holes 4, where it is absorbed by the sponge.

In Fig. 4 is illustrated a modification of the vessel in which the same is formed with an annular lip 6, which projects slightly beyond the wall of the vessel. The upper face of this lip inclines downward to its junction with the wall of the vessel to form an annular channel, and the wall of the vessel tapers slightly from a slight distance above the lip to its junction with the lip, as shown at 7. Through the tapered portion 7 is formed a plurality of holes 8, the axes of which are on the same downward inclination as the face of the lip 6, the holes being at the bottom of the annular channel formed by the lip. The channeled lip 6, and holes 8, serve the same purpose as the channels 5 and holes 4 of the other figures.

In practice a piece of soft sponge or other suitable absorbent is placed in the vessel so as to fill the same and extend above the rim. The vessel is preferably wholly inserted and is removed only for the purpose of cleansing the sponge. The device thus meets all the requirements of a thoroughly sanitary appliance and eliminates the discomfort and inconvenience of appliances in common use.

Having described my invention, what I claim as new and desire to secure by Letters Patent, is:

1. In a device of the character described, a cup or vessel for retaining an absorbent element, having a flared rim portion and apertures which extend through its wall, the lower end of said vessel terminating in a finger receiving member.

2. In a device of the character described, a cup or vessel having a flared rim portion, and terminating at its opposite end in a finger receiving portion, said vessel having apertures extending through its wall at a downward inclination, and a channel in said wall connecting said apertures.

3. In a device of the character described, a cup or vessel, the lower portion of which tapers toward its end and terminates in a ring, while the upper portion terminates in a flared rim, said vessel having holes extending through its wall at a downward inclination from the outside of the wall, and a channel having a similarly inclined lip connecting said holes, said vessel being adapted to hold an absorbent element.

4. In a device of the character described, an elongated cup or vessel, the lower portion of which tapers and terminates in a ring, the upper portion thereof terminating in a flared rim, said vessel having a channel in its periphery intermediate of its ends, and holes extending from said channel at a downward inclination through the wall of the vessel, said vessel being adapted to hold an absorbent element.

5. In a device of the character described, an elongated cup or vessel, the lower portion of which terminates in a ring, while the upper portion terminates in a flared rim, an annular lip intermediate of the end of the vessel arranged to form a channel, the vessel having holes extending through its wall at a downward inclination from the channel, and being adapted to hold an absorbent element.

6. In a device of the character described, a cup or vessel having an annular lip intermediate of its length, the face of which inclines downward to its junction with the wall of the vessel to form a channel, the said wall being slightly tapered from a point above the lip to its junction therewith, and having holes extending therethrough on a level with and at the same inclination as the face of the lip, the lower portion of said vessel being tapered and terminating in a ring while the upper portion terminates in a flared rim, and an absorbent element in said vessel.

In testimony whereof I affix my signature in presence of two witnesses.

LESTER E. NORQUIST.

Witnesses:
G. SARGENT ELLIOTT,
ELIZABETH SMITH.